US012562647B2

(12) United States Patent
Nguyen

(10) Patent No.: US 12,562,647 B2
(45) Date of Patent: Feb. 24, 2026

(54) DUAL-OUTPUT SWITCHED-CAPACITOR POWER CONVERTER

(71) Applicant: Empower Semiconductor, Inc., San Jose, CA (US)

(72) Inventor: Bai Nguyen, Fremont, CA (US)

(73) Assignee: Empower Semiconductor, Inc., Milpitas, CA (US)

( * ) Notice: Subject to any disclaimer, the term of this patent is extended or adjusted under 35 U.S.C. 154(b) by 0 days.

(21) Appl. No.: 18/909,851

(22) Filed: Oct. 8, 2024

(65) Prior Publication Data

US 2025/0030343 A1 Jan. 23, 2025

Related U.S. Application Data

(63) Continuation of application No. 17/838,080, filed on Jun. 10, 2022, now Pat. No. 12,136,879.

(60) Provisional application No. 63/210,886, filed on Jun. 15, 2021.

(51) Int. Cl.
| | |
|---|---|
| *H02M 3/07* | (2006.01) |
| *H02M 1/36* | (2007.01) |
| *H02M 3/158* | (2006.01) |

(52) U.S. Cl.
CPC ............. *H02M 3/158* (2013.01); *H02M 1/36* (2013.01); *H02M 3/07* (2013.01)

(58) Field of Classification Search
CPC .............................................. H02M 3/07–078
See application file for complete search history.

(56) References Cited

U.S. PATENT DOCUMENTS

| | | | |
|---|---|---|---|
| 11,552,562 B1 | 1/2023 | Roessig | |
| 2007/0091655 A1* | 4/2007 | Oyama | H02M 3/07 |
| | | | 363/59 |
| 2007/0211503 A1* | 9/2007 | Oyama | H02M 3/07 |
| | | | 363/62 |

(Continued)

FOREIGN PATENT DOCUMENTS

| | | |
|---|---|---|
| KR | 20180085335 A | 7/2018 |
| WO | 2011103058 A1 | 8/2011 |
| WO | 2017125284 A1 | 7/2017 |

OTHER PUBLICATIONS

H. Le, S. R. Sanders and E. Alon, "Design Techniques for Fully Integrated Switched-Capacitor DC-DC Converters," in IEEE Journal of Solid-State Circuits, vol. 46, No. 9, pp. 2120-2131, Sep. 2011.

(Continued)

*Primary Examiner* — Sisay G Tiku
(74) *Attorney, Agent, or Firm* — FisherBroyles, LLP

(57) ABSTRACT

A power converter circuit is disclosed. In one aspect, the power converter circuit includes a power input terminal, a first output terminal and a second output terminal, a plurality of capacitors coupled to the power input terminal, the first output terminal and the second output terminal, a plurality of switches coupled to the plurality of capacitors and arranged to repetitively cycle the plurality of capacitors between a first configuration and a second configuration to generate a first output voltage at the first output terminal and a second output voltage at the second output terminal, and where the circuit is arranged to limit a maximum voltage applied to each of the plurality of capacitors and switches to a fraction of a voltage at the power input terminal.

20 Claims, 3 Drawing Sheets

(56)  References Cited

U.S. PATENT DOCUMENTS

| | | | |
|---|---|---|---|
| 2008/0239772 A1 | 10/2008 | Oraw | |
| 2009/0278520 A1 | 11/2009 | Perreault | |
| 2009/0323378 A1* | 12/2009 | Melse | H02M 3/07 |
| | | | 363/60 |
| 2009/0326624 A1* | 12/2009 | Melse | A61N 1/378 |
| | | | 607/116 |
| 2011/0204724 A1 | 8/2011 | Verma | |
| 2011/0204959 A1 | 8/2011 | Sousa | |
| 2019/0082505 A1 | 3/2019 | Delos Ayllon | |
| 2023/0283182 A1 | 9/2023 | Nguyen | |
| 2024/0079954 A1 | 3/2024 | Chen | |

OTHER PUBLICATIONS

J. F. Dickson, "On-chip high-voltage generation in MNOS integrated circuits using an improved voltage multiplier technique," in IEEE Journal of Solid-State Circuits, vol. 11, No. 3, pp. 374-378, Jun. 1976.

\* cited by examiner

DUAL-OUTPUT SWITCHED-CAPACITOR POWER CONVERTER

CROSS REFERENCE TO RELATED APPLICATIONS

This application is a continuation of U.S. application Ser. No. 17/838,080, for "DUAL-OUTPUT SWITCHED-CA-PACITOR POWER CONVERTER," filed on Jun. 10, 2022, which claims priority to U.S. provisional patent application Ser. No. 63/210,886, for "DUAL-OUTPUT SWITCHED-CAPACITOR POWER CONVERTER" filed on Jun. 15, 2021 which are all hereby incorporated by reference in their entirety for all purposes.

FIELD

The described embodiments relate generally to power converters, and more particularly, the present embodiments relate to power converter circuits that employ switched-capacitor circuits.

BACKGROUND

A wide variety of electronic devices are available for consumers today. Many of these devices have integrated circuits that are powered by regulated low voltage DC power sources. These low voltage power sources are often generated by dedicated power converter circuits that use a higher voltage input from a battery or another power source. In some applications, the dedicated power converter circuit can be one of the largest power dissipating components of the electronic device and can sometimes consume more space than the integrated circuit that it powers. As electronic devices become more sophisticated and more compact, more efficient power converter circuits are called for.

SUMMARY

In some embodiments, a circuit is disclosed. The circuit includes a power input terminal, a first output terminal and a second output terminal, a plurality of capacitors coupled to the power input terminal, the first output terminal and the second output terminal, a plurality of switches coupled to the plurality of capacitors and arranged to repetitively cycle the plurality of capacitors between a first configuration and a second configuration to generate a first output voltage at the first output terminal and a second output voltage at the second output terminal. The circuit is arranged to limit a maximum voltage applied to each of the plurality of capacitors to a fraction of a voltage at the power input terminal.

In some embodiments, the circuit is further arranged to limit a maximum voltage applied to each of the plurality of switches to the fraction of a voltage at the power input terminal.

In some embodiments, a value of the fraction is ⅓ or less.

In some embodiments, the circuit is further arranged to limit a maximum voltage swing at a bottom plate or at a top plate of each of the plurality of capacitors to a second fraction of the voltage at the power input terminal.

In some embodiments, the second output voltage has a value that is lower than the first output voltage.

In some embodiments, the plurality of switches are further arranged to connect at least one capacitor from the plurality of capacitors between the first output terminal and the second output terminal such that a current from the first output terminal is circulated to the second output terminal.

In some embodiments, the circuit further includes a wide-band voltage divider.

In some embodiments, the wide-band voltage divider is arranged to provide the first and second output voltages during a start-up time period.

In some embodiments, the wide-band voltage divider is arranged to reduce low-frequency and high-frequency variations in voltage values in the first and second output voltages.

In some embodiments, each of the plurality of switches is a metal-oxide-semiconductor field effect transistor (MOS-FET).

In some embodiments, each of the plurality of capacitors is a metal-oxide-semiconductor capacitor.

In some embodiments, each of the plurality of capacitors is a MOSFET capacitor.

In some embodiments, a circuit is disclosed. The circuit includes a power input terminal, a first output terminal and a second output terminal, a plurality of capacitors coupled to the power input terminal, the first output terminal and the second output terminal, a plurality of switches coupled to the plurality of capacitors and arranged to repetitively cycle the plurality of capacitors between a first configuration and a second configuration to generate a first output voltage at the first output terminal and a second output voltage at the second output terminal. The circuit is arranged to limit a maximum voltage applied to each of the plurality of switches to a fraction of a voltage at the power input terminal.

In some embodiments, the circuit is further arranged to limit a maximum voltage applied to each of the plurality of capacitors to the fraction of a voltage at the power input terminal.

In some embodiments, a value of the fraction is ⅓ or less.

In some embodiments, the second output voltage has a value that is lower than the first output voltage.

In some embodiments, the circuit further includes a wide-band voltage divider.

In some embodiments, a circuit is disclosed. The circuit includes a power input terminal, a first output terminal and a second output terminal, a plurality of capacitors coupled to the power input terminal, the first output terminal and the second output terminal, a plurality of switches coupled to the plurality of capacitors and arranged to repetitively cycle the plurality of capacitors between a first configuration and a second configuration to generate a first output voltage at the first output terminal and a second output voltage at the second output terminal. The circuit is arranged to limit a maximum voltage applied to each of the plurality of switches and to each of the plurality of capacitors to a fraction of a voltage at the power input terminal.

In some embodiments, the circuit is further arranged to limit a maximum voltage swing at a bottom plate or at a top plate of each of the plurality of capacitors to a second fraction of the voltage at the power input terminal.

In some embodiments, each of the plurality of switches is a metal-oxide-semiconductor field effect transistor (MOS-FET).

DETAILED DESCRIPTION

Figure 1:
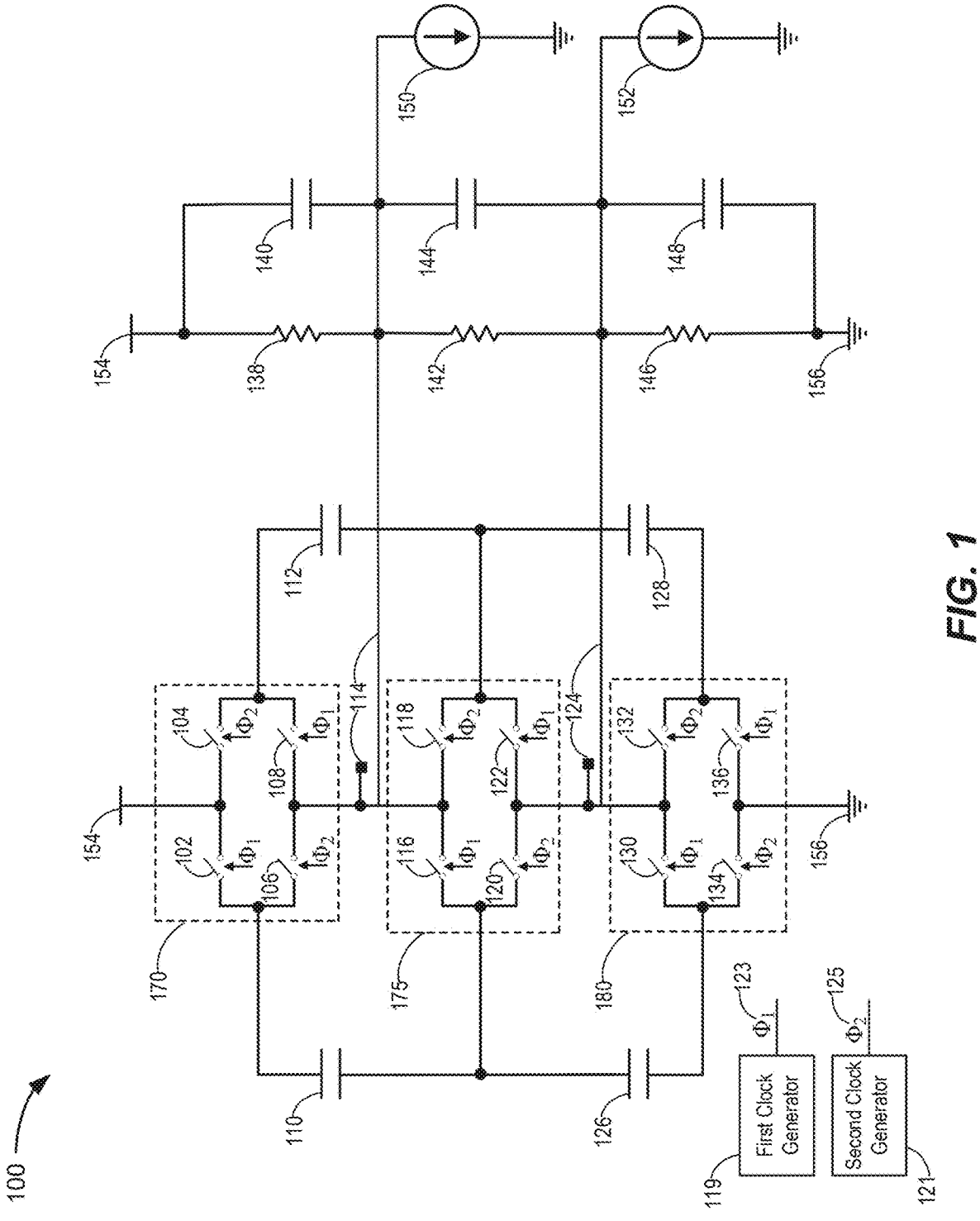
FIG. 1 illustrates a dual-output switched-capacitor power converter circuit according to an embodiment of the disclosure.

Circuits and related techniques disclosed herein relate generally to power converters. More specifically, circuits, devices and related techniques disclosed herein relate to switched-capacitor power converters circuits that have multiple power outputs. In some embodiments, the power converter circuit employs a set of switches that control the charging and discharging of two or more flying capacitors. The set of switches can control the two or more flying capacitors such that the two or more flying capacitors can be selectively charged by a power source in a first time interval and then be selectively coupled to a load in a second time interval. In various embodiments, the power converter circuit can generate two or more output power sources simultaneously to support system-on-chip architectures.

Embodiments of the disclosed power converter circuit architecture can enable operation of the power converter circuit with relatively low voltage stresses across both the set of switches and the two or more capacitors. In this way, switches and capacitors employed in the disclosed power converter circuits can use switches and/or transistors that have relatively small size and use relatively thin oxide. In some embodiments, the disclosed power converter circuits can have lower power loss and higher operating efficiencies. In various embodiments, a dual-output switched-capacitor power converter circuit can have relatively low voltage variations at its outputs by recirculating currents from a high-side output power supply to a low-side output power supply and vice versa.

In some embodiments, the power converter circuits may employ an architecture that enables circulation of current from one output power supply to the other output power supply. This can result in conservation of charge and reduce power losses, while allowing for relatively low voltage variations at the output terminals. Further, the circulating currents can allow the use of a single circuit to generate multiple output power supplies, eliminating a need for multiple independent power converter circuits. In various embodiments, a dual-output switched-capacitor power converter can be utilized in applications that use high-efficiency and extremely fast-response on-chip direct-current to direct-current (DC-DC) converters. These applications can include, but are not limited to, on-chip auxiliary supply rails for drivers of switching regulators and multiple supply voltages for system-on-chip applications. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 illustrates a dual-output switched-capacitor power converter circuit 100 according to an embodiment of the disclosure. As shown in FIG. 1, circuit 100 can include four capacitors 110, 112, 126 and 128 connected between an input terminal ($V_{in}$) 154 and ground 156. Circuit 100 can also include a first output terminal 114 and a second the second output terminal 124. The first output terminal 114 may also be referred to as high-side output terminal. The second output terminal 124 may also be referred to as low-side output terminal. Circuit 100 can also include switches 102, 104, 106, 108, 116, 118, 120, 122, 130 132, 134 and 136. Switches 102, 104, 106 and 108 can form a first switching matrix 170, switches 116, 118, 120 and 122 can form a second switching matrix 175 and switches 130, 132, 134 and 136 can form a third switching matrix 180.

Circuit 100 can also include a first clock generator 119 and second clock generator 121, that generate a first clock 123 and a second clock 125. Switches 102, 108, 116, 122, 130 and 136 can be controlled by the first clock 123, while switches 104, 106, 118, 120, 132 and 134 can be controlled by the second clock 125. The first clock and the second clock are non-overlapping clocks and typical frequencies may vary from 10 KHZ to 100 MHZ. At the first output terminal 114 and at the second output terminal 124, resistors 138, 142 and 146, and capacitors 140, 144, and 148 can form a wide-band voltage divider configured to set an output voltage at the first output terminal 114 to ⅔ of $V_{in}$ and at the second output terminal 124 to ⅓ of $V_{in}$ during start-up time period of circuit 100. A start-up time period can be defined as a time interval prior to the steady state operation of circuit 100. During a relatively fast start-up period, $V_{in}$ may rise at a relatively fast rate. As appreciated by one of ordinary skill in the art having the benefit of this disclosure, a value of a voltage at the output terminals 114 and 124 can be set to any suitable value as appropriate for specific applications.

In some embodiments, circuit 100 can include a power input terminal, a first output terminal and a second output terminal, a plurality of capacitors coupled to the power input terminal, the first output terminal and the second output terminal, a plurality of switches coupled to the plurality of capacitors and arranged to repetitively cycle the plurality of capacitors between a first configuration and a second configuration to generate a first output voltage at the first output terminal and a second output voltage at the second output terminal. Circuit 100 may be arranged to limit a maximum voltage applied to each of the plurality of capacitors to a fraction of a voltage at the power input terminal. In various embodiments, circuit 100 may be arranged to limit a maximum voltage applied to each of the plurality of switches to a fraction of a voltage at the power input terminal. In some embodiments, circuit 100 may be arranged to limit a maximum voltage applied to each of the plurality of switches and each of the plurality of capacitors to a fraction of a voltage at the power input terminal.

During a relatively slow start-up of circuit 100, resistors 138, 142 and 146 may be used to generate an output voltage at the first output terminal 114 equal $\frac{2}{3}$ of $V_{in}$ and at the second output terminal 124 to $\frac{1}{3}$ of $V_{in}$. For relatively fast start-up, capacitors 140, 144, and 148 may be utilized to generate an output voltage at the first output terminal 114 equal $\frac{2}{3}$ of $V_{in}$ and at the second output terminal 124 to $\frac{1}{3}$ of $V_{in}$. Thus, during start-up, resistors 138, 142 and 146 can be used to reduce low frequency voltage variations, while capacitors 140, 144, and 148 can used to reduce high frequency voltage variations. In this way, a stable voltage is generated at the output terminals 114 and 124. In some embodiments, the voltage variations at the first and second output terminals can be reduced to less than 100 mV for an input voltage at the input terminal of 3.3 V, while in other embodiments the voltage variations may be reduced to less than 10 mV and yet in other embodiments the voltage variations can be reduced to less than 1 mV. Circuit 100 can include output loads which are depicted as current loads 150 and 152 connected to the output terminals 114 and 124, respectively. The detailed operation of circuit 100 will be described in greater detail below.

Figure 2B:
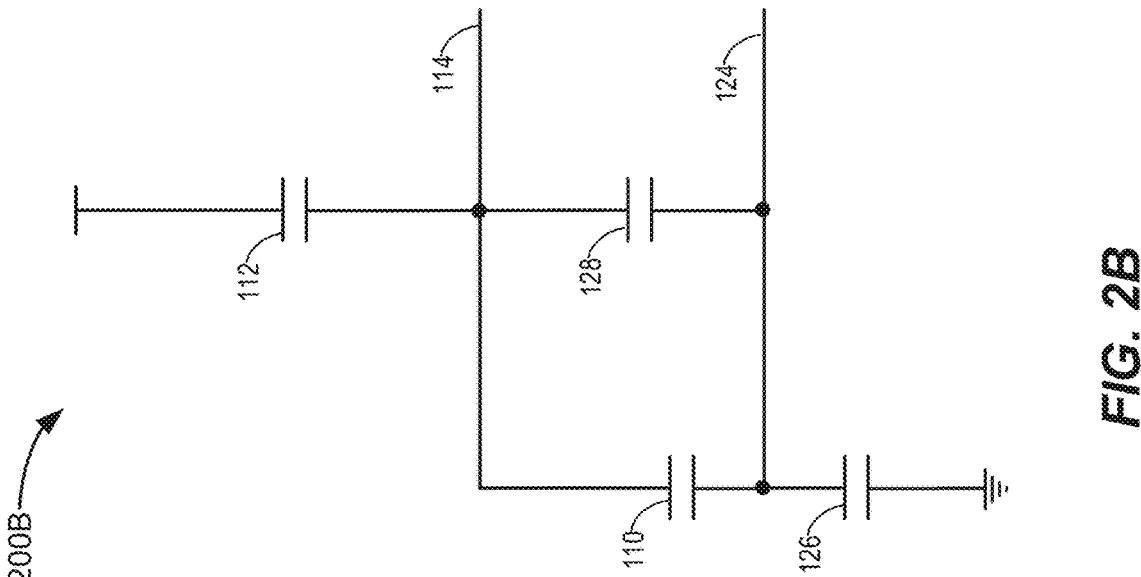
FIG. 2B illustrates an equivalent circuit of steady state operation of the circuit in FIG. 1, where the first clock is at a low state and the second clock is at a high state.
Figure 2A:
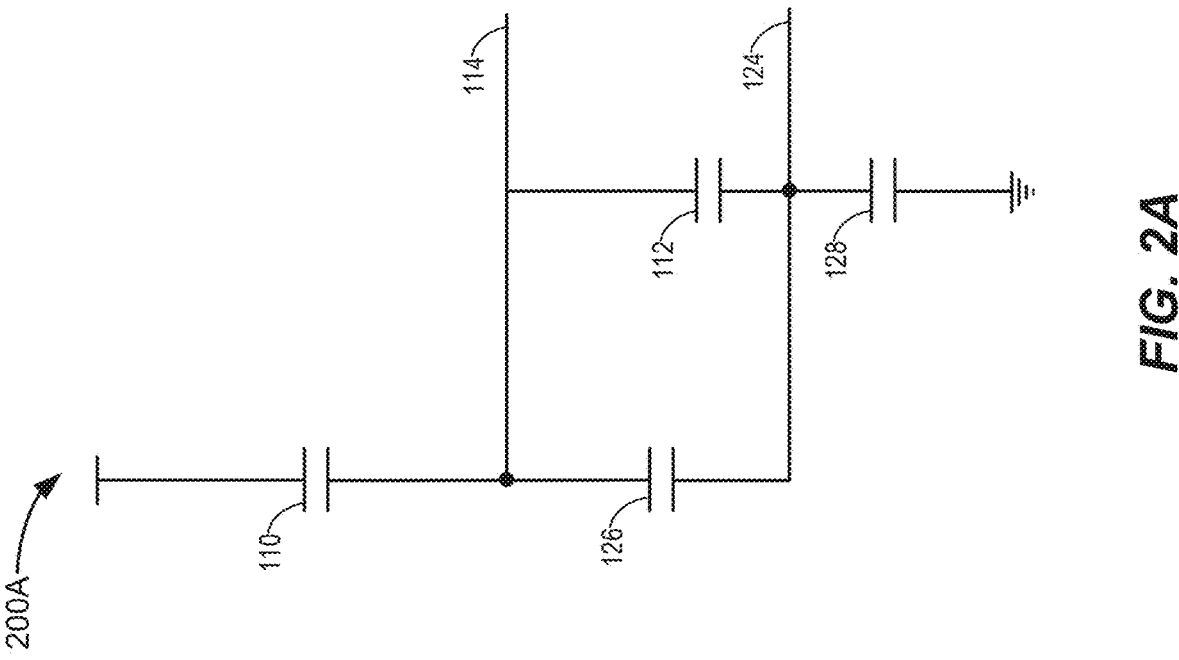
FIG. 2A illustrates an equivalent circuit of steady state operation of the circuit in FIG. 1, where a first clock is at a high state and the second clock is at a low state.

Turning now to FIGS. 2A and 2B, equivalent circuits of steady state operation of circuit 100 are illustrated. FIG. 2A shows an equivalent circuit 200A where the first clock is at a high state and a second clock is at a low state. As can be seen in circuit 200A, there is a capacitor divider formed by capacitors 110, 112, 126 and 128. Thus, an output voltage at the first output terminal 114 can be $\frac{2}{3}$ of $V_{in}$ and $\frac{1}{3}$ of $V_{in}$ at the second output terminal 124. Each of capacitors 110, 112, 126 and 128, also referred to as flying capacitors, are charged to $\frac{1}{3}$ of $V_{in}$. Thus, the voltage stress on each flying capacitor and each switch can be $\frac{1}{3}$ of $V_{in}$. For example, if $V_{in}$=3 V, then the voltage stress on each flying capacitor and each switch is 1 V. This can allow the implementation of capacitors and switches using thin-oxide metal-oxide-semiconductor field effect transistors (MOSFET) or metal-oxide-semiconductor (MOS) capacitors in modern short-channel fabrication processes. This implementation can minimize the die area used to generate $\frac{1}{3}$ and $\frac{2}{3}$ conversion ratios at the same time. As appreciated by one of ordinary skill in the art having the benefit of this disclosure, the value for $V_{in}$ can be set to any suitable value as appropriate for specific applications. Further, a value of conversion ratios can be set to any suitable value as appropriate for specific applications.

FIG. 2B shows an equivalent circuit 200B where the second clock is at a high state and the first clock is at a low state. As can be seen in circuit 200B, there is a capacitor divider formed by capacitors 112, 110, 128 and 126. Thus, an output voltage at the first output terminal 114 can be $\frac{2}{3}$ of $V_{in}$ and $\frac{1}{3}$ of $V_{in}$ at the second output terminal 124. In this way, the switching capacitors see only a stress voltage of $\frac{1}{3}$ of $V_{in}$. Similarly, the voltage stress on switches 102, 104, 106, 108, 116, 118, 120, 122, 130, 132, 134 and 136 can be $\frac{1}{3}$ of $V_{in}$. As a result, there can be relatively low power loss in the disclosed switched-capacitor power converter because a power loss resulted from parasitic capacitance of switches is $C \times V^2$; further, because a value for V is $\frac{1}{3}$ of $V_{in}$ the converter can benefit from a reduction of power loss. Circuit 100 can allow for efficiencies of, for example, 88% at load currents of 5 mA pull-up at the higher voltage at the first output terminal 114 and 5 mA pull-down at the lower voltage output at the second output terminal 124. As appreciated by one of ordinary skill in the art having the benefit of this disclosure, the value of achievable efficiencies and load currents can vary. Further, circuit 100 can allow voltage swings at bottom or top plates of each flying capacitor to be $\frac{1}{3}$ of $V_{in}$. This low voltage swing can reduce the power loss from the parasitic capacitance at the bottom plates of the flying capacitors. Additionally, a voltage swing at each switch can be between $\frac{1}{3}$ of $V_{in}$ and DC levels, for example, between ground to $V_{in}/3$, or between $V_{in}/3$ to $2 \ast V_{in}/3$, or $2 \ast V_{in}/3$ to $V_{in}$. Some embodiments may employ drivers and level shifter circuits to control the switches.

Figure 3B:
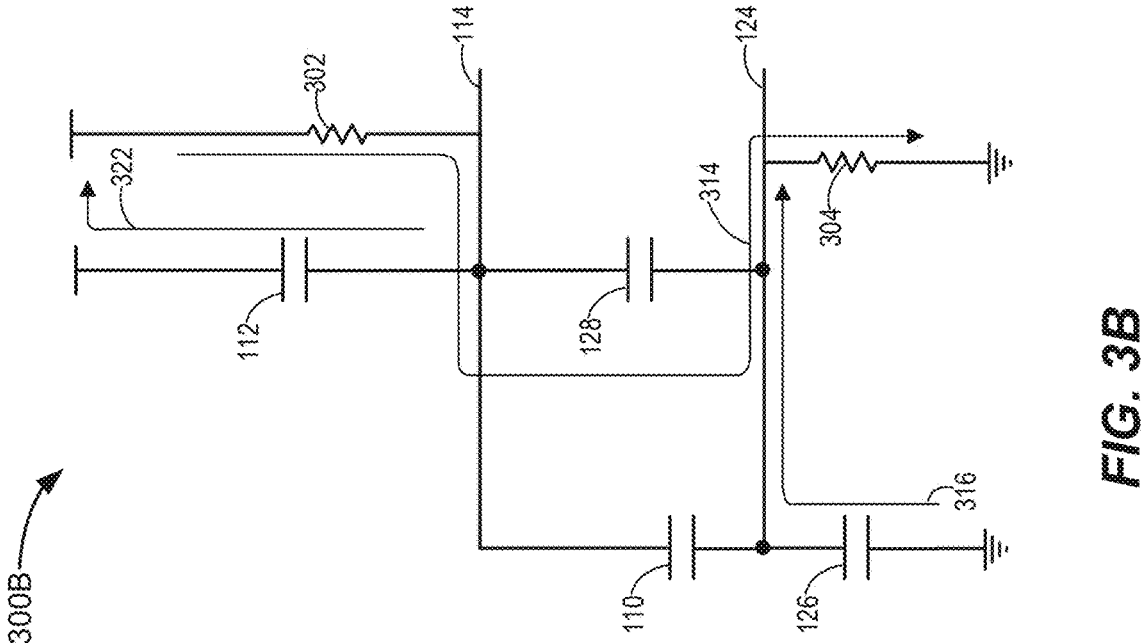
FIG. 3B illustrates an equivalent circuit of steady state operation of the circuit in FIG. 1, further illustrating circulating currents where the first clock is at a low state and the second clock is at a high state, and the pull-up load resistor is connected to the higher voltage output and a pull-down load resistor is connected to the lower voltage output.
Figure 3A:
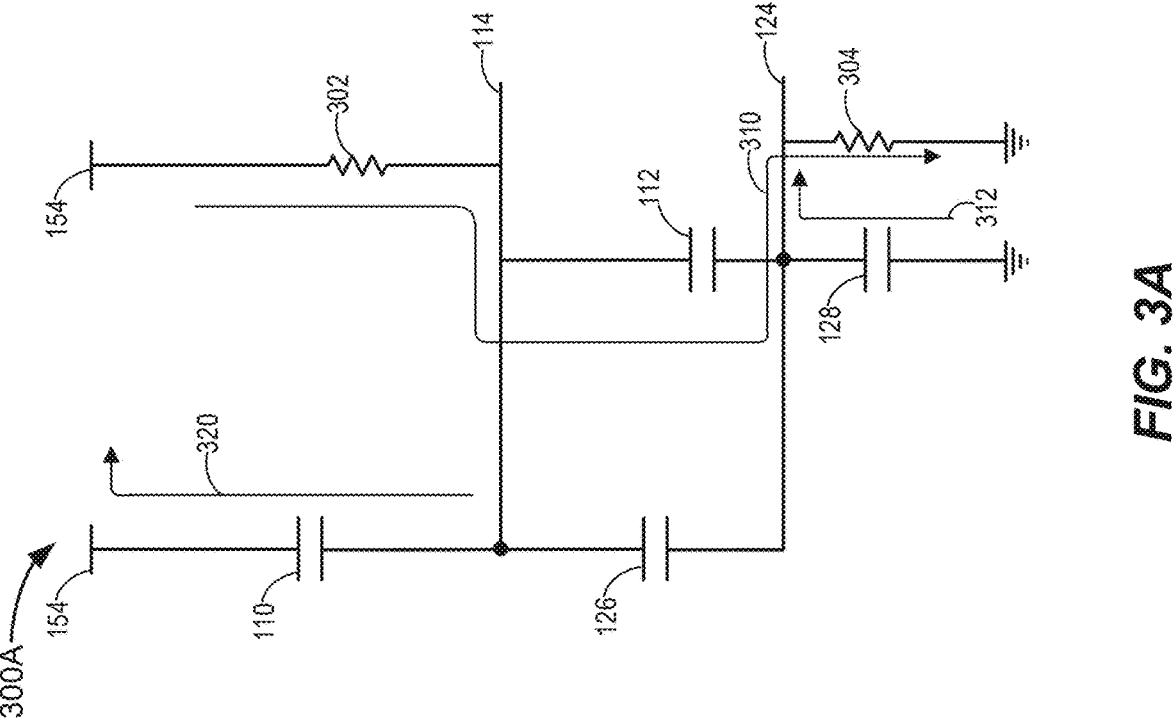
FIG. 3A illustrates an equivalent circuit of steady state operation of the circuit in FIG. 1, further illustrating circulating currents where the first clock is at a high state and the second clock is at a low state, and where a pull-up load resistor is connected to a higher voltage output and a pull-down load resistor is connected to a lower voltage output.

Turning now to FIGS. 3A and 3B, a circulating current feature of circuit 100 is illustrated. The circulating current feature of circuit 100 can enable reduction of voltage variations when there are pull-up loads at the first output terminal 114 and pull-down loads at the second output terminal 124. Furthermore, the circulating current can eliminate a need for two independent power converter circuits. FIG. 3A shows an equivalent circuit 300A where the first clock is at a high state and the second clock is at a low state, and where a pull-up load resistor 302 is connected to a higher voltage at the first output terminal 114 and a pull-down load resistor 304 is connected to a lower voltage at the second output terminal 124.

Circuit 300A can include a pull-up load resistor 302 connected at the first output terminal 114 and a pull-down load resistor 304 connected at the second output terminal 124. In some embodiments, flying capacitors can be connected between the output terminals 114 and 124, thus creating a path for the current flow between output terminals 114 and 124 as illustrated in FIG. 3A. Consequently, there can be cross-regulation between the first output terminal 114 and the second output terminal 124 that can be useful to reduce output voltage variations at the output terminals. This cross-regulation can balance a strength at the first output terminal 114 and the second output terminal 124 strength, thus reducing the dropout voltage and reducing power loss at each output terminal. For example, a current flowing out at the second output terminal 124 can be supplied by currents 310 and 312. This can minimize the voltage variations at the second output terminal 124 because an output current at the second output terminal 124 can be supplied partially by current 310 and partially by current 312. In some embodiments, the voltage variations at the first and second output terminals can be reduced to less than 100 mV for an input voltage at the input terminal of 3.3 V, while in other embodiments the voltage variations may be reduced to less than 10 mV and yet in other embodiments the voltage variations can be reduced to less than 1 mV. In various embodiments, a current flowing out at the first output terminal 114 can be supplied by currents 320 and 310. This can minimize the voltage variations at the first output terminal 114 because an output current at the first output terminal 114 can be supplied partially by current 320 and partially by current 310.

FIG. 3B shows an equivalent circuit 300B where the second clock is at a high state and the first clock is at a low state, and where a pull-up load resistor 302 is connected to a higher voltage at the first output terminal 114 and a pull-down load resistor 304 is connected to a lower voltage the second output terminal 124. In some embodiments, flying capacitors can be connected between the two outputs terminals 114 and 124, thus creating a path for the current flow between output terminals 114 and 124 as illustrated in FIG. 3B. Consequently, there can be cross-regulation between a high-side output terminal and a low-side output terminal that can be useful to reduce output voltage variations at the output terminals.

This cross-regulation can balance a strength at the first output terminal 114 and the second output terminal 124 strength, thus reducing the dropout voltage and reducing power loss at each output terminal. For example, a current flowing out at the second output terminal 124 can be supplied by currents 314 and 316. This can minimize the voltage variations at the second output terminal 124 because an output current at the second output terminal 124 can be supplied partially by current 314 and partially by current 316. As another example, a current flowing out at the first output terminal 114 can be supplied by currents 322 and 314. This can minimize the voltage variations at the first output terminal 114 because an output current at the first output terminal 114 can be supplied partially by current 322 and partially by current 314.

Although dual-output switched-capacitor power converter circuits are described and illustrated herein with respect to one particular configuration of switched-capacitor power converter circuits, embodiments of the disclosure are suitable for use with other configurations of switched-capacitor power converters. For example, multiple-output switched-capacitor power converter circuits can employ embodiments of the disclosure to generate various other output voltages at output terminals.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising:
   a power input terminal, a first output terminal and a second output terminal;
   a plurality of capacitors coupled to the power input terminal, the first output terminal and the second output terminal; and
   a plurality of switches coupled to the plurality of capacitors and arranged to repetitively cycle the plurality of capacitors between a first configuration and a second configuration to generate a first output voltage at the first output terminal and a second output voltage at the second output terminal, and arranged to connect at least one capacitor from the plurality of capacitors between the first output terminal and the second output terminal such that a current from the first output terminal is circulated to the second output terminal.

2. The circuit of claim 1, wherein the circuit is arranged to limit a maximum voltage applied to each of the plurality of switches to a fraction of a voltage at the power input terminal.

3. The circuit of claim 2, wherein a value of the fraction of the voltage is ⅓ or less.

4. The circuit of claim 1, wherein the circuit is arranged to limit a maximum voltage applied to each of the plurality of capacitors to a fraction of a voltage at the power input terminal.

5. The circuit of claim 1, wherein the circuit is further arranged to limit a maximum voltage swing at a bottom plate or at a top plate of each of the plurality of capacitors to a second fraction of a voltage at the power input terminal.

6. The circuit of claim 1, wherein the second output voltage has a value that is lower than the first output voltage.

7. The circuit of claim 1, further comprising a wide-band voltage divider.

8. The circuit of claim 7, wherein the wide-band voltage divider is arranged to provide the first and second output voltages during a start-up time period.

9. The circuit of claim 8, wherein the wide-band voltage divider is arranged to reduce low-frequency and high-frequency variations in voltage values in the first and second output voltages.

10. The circuit of claim 1, wherein each of the plurality of switches is a metal-oxide-semiconductor field effect transistor (MOSFET).

11. The circuit of claim 1, wherein each of the plurality of capacitors is a metal-oxide-semiconductor capacitor.

12. The circuit of claim 1, wherein each of the plurality of capacitors is a metal-oxide-semiconductor field effect transistor arranged to act as a capacitor.

13. A circuit comprising:
a power input terminal, a first output terminal and a second output terminal;
a plurality of capacitors coupled to the power input terminal, the first output terminal and the second output terminal;
a plurality of switches coupled to the plurality of capacitors and arranged to repetitively cycle the plurality of capacitors between a first configuration and a second configuration to generate a first output voltage at the first output terminal and a second output voltage at the second output terminal; and
wherein a cross regulation balances a strength at the first output terminal and the second output terminal, thereby reducing voltage variation of the first and second output voltages.

14. The circuit of claim 13, wherein the circuit is further arranged to limit a maximum voltage applied to each of the plurality of capacitors to a fraction of a voltage at the power input terminal.

15. The circuit of claim 13, wherein the circuit is arranged to limit a maximum voltage applied to each of the plurality of switches to a fraction of a voltage at the power input terminal.

16. The circuit of claim 13, wherein the second output voltage has a value that is lower than the first output voltage.

17. The circuit of claim 13, wherein the plurality of switches are further arranged to connect at least one capacitor from the plurality of capacitors between the first output terminal and the second output terminal such that a current from the first output terminal is circulated to the second output terminal.

18. A method of operating a circuit, the method comprising:
providing a power input terminal, a first output terminal and a second output terminal;
providing a plurality of capacitors coupled to the power input terminal, the first output terminal and the second output terminal;
providing a plurality of switches coupled to the plurality of capacitors;
repetitively cycling, by the plurality of switches, the plurality of capacitors between a first configuration and a second configuration to generate a first output voltage at the first output terminal and a second output voltage at the second output terminal; and
connecting at least one capacitor from the plurality of capacitors between the first output terminal and the second output terminal such that a current from the first output terminal is circulated to the second output terminal.

19. The method of claim 18, wherein the circuit arranged to limit a maximum voltage applied to each of the plurality of switches to a fraction of a voltage at the power input terminal.

20. The method of claim 18, wherein each of the plurality of switches is a metal-oxide-semiconductor field effect transistor (MOSFET).

* * * * *